United States Patent [19]

Harada et al.

[11] Patent Number: 4,534,622
[45] Date of Patent: Aug. 13, 1985

[54] SOLID-STATE DEVICE HAVING A PLURALITY OF OPTICAL FUNCTIONS

[75] Inventors: Nozomu Harada; Yasuhisa Oana, both of Yokohama; Keisuke Ogi, Tokyo; Koji Izawa, Yokohama; Akira Taya, Kawasaki; Masanori Sakamoto, Yokohama, all of Japan

[73] Assignee: Tokyo Shibaura Denki Kabushiki Kaisha, Kawasaki, Japan

[21] Appl. No.: 567,558

[22] Filed: Jan. 3, 1984

[30] Foreign Application Priority Data

Feb. 28, 1983 [JP] Japan .................................. 58-32430

[51] Int. Cl.$^3$ ............................................... G02F 1/13
[52] U.S. Cl. ..................................... 350/334; 350/333; 350/342; 350/338
[58] Field of Search ................. 350/342, 333, 334, 357

[56] References Cited

FOREIGN PATENT DOCUMENTS 56-70530  6/1981  Japan .................................. 350/342

OTHER PUBLICATIONS

SID 82 Digest, Y. Okubo, et al., "Large-Scale LCDs Addressed by a-Si TFT Array", (1982), pp. 40-41.
The 14th Conf. on Solid State Devices, Digest of Tech. Papers (1982), K. Ozawa et al., "Contact-Type Linear Sensor Using Amorphous Si Diode Array," pp. 125-126.

Primary Examiner—John K. Corbin
Assistant Examiner—Richard F. Gallivan
Attorney, Agent, or Firm—Oblon, Fisher, Spivak, McClelland & Maier

[57] ABSTRACT

A solid-state optical device with a plurality of cells having a plurality of optical functions is disclosed. Each of the cells comprises a transparent substrate, an antireflection film formed on the lower surface of the transparent substrate, a MOS transistor and a capacitor formed on the upper surface of the transparent substrate, a liquid crystal display device formed on the MOS transistor and capacitor, and window for leading a light signal incident on the liquid crystal display device from above to the transparent substrate. At least either a channel region of the MOS transistor and a region intervening between pair electrodes of the capacitor is formed of a photoconductive film. A transparent medium intervenes between the transparent substrate and photoconductive film such that light signal led through the window to the transparent substrate is reflected by an object disposed in contact with antireflection film to reach the photoconductive film, thereby generating carriers therein.

10 Claims, 14 Drawing Figures

F I G. 6
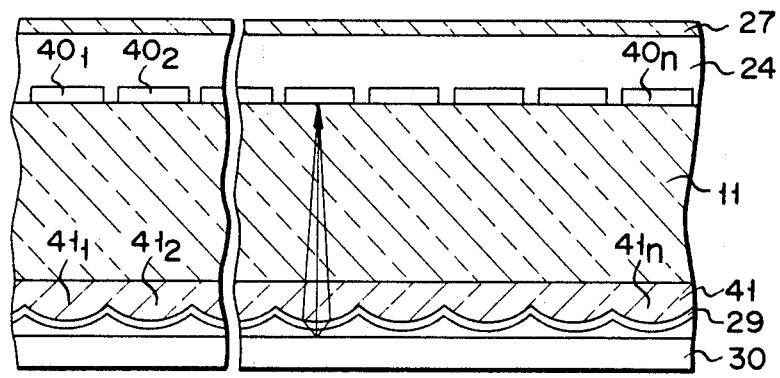
F I G. 7
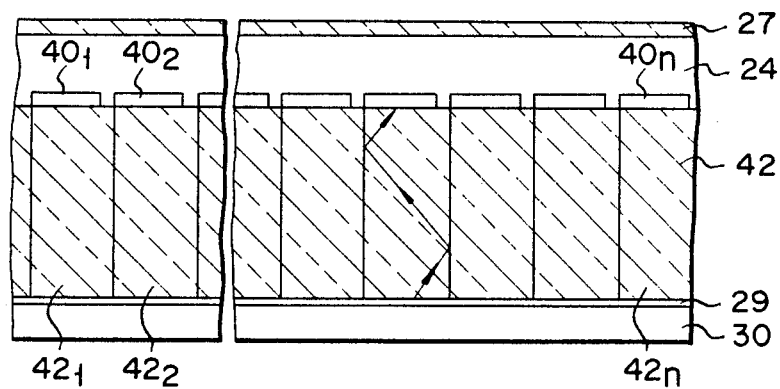

SOLID-STATE DEVICE HAVING A PLURALITY OF OPTICAL FUNCTIONS

BACKGROUND OF THE INVENTION

This invention relates to a solid-state device which performs various optical functions, such as forming, displaying and printing an image.

Heretofore, various display devices for displaying data, imaging devices for imaging data and hard copy devices for copying or printing data have been in practical use.

A liquid crystal display panel with amorphous silicon thin film transistors fabricated on a glass substrate is disclosed in Y. Okubo et al., "Large-Scale LCDs Addressed by a-Si TFT Array", SID 82 Digest pp 40–41, 1982. This display panel has only a display function. Also, a contact-type linear sensor using amorphous silicon diode array fabricated on a glass substrate is disclosed in K. Ozawa et al., "Contact type Linear Sensor Using Amorphous Si Diode Array", the 14th Conf. on Solid State Device, Digest of Tech. Papers, pp 125–126, 1982. This sensor has only imaging function and does not have any display function. That is, no device which has a plurality of different functions has yet been in practical use.

Electronic mails, for instance, require a device, which can temporalily store all data transferred, display these data when required and permit printing of only desired data as hard copy. The device as described is demanded to alleviate the burden on the copying sheet that would be very significant otherwise, i.e., in case when all transmitted data is automatically copied. Particularly, a single panel with which a plurality of functions as described, would be desired from the standpoints of size reduction, weight reduction and cost reduction.

SUMMARY OF THE INVENTION

An object of the invention is to provide a solid-state optical device, which has a plurality of functions such as displaying, imaging and printing.

These and other objects have been attained by a solid-state device having a plurality of functions comprising a transparent substrate, an anti-reflection film formed on the underside of the transparent substrate and a plurality of optical elements formed on the upper surface of the transparent substrate, each of the optical elements comprising:

a MOS transistor formed on the upper surface of said transparent substrate including a source-drain path having one end connected to a data line, a channel region, a gate oxide film and a gate electrode connected to an address line;

a capacitor formed on the upper surface of the transparent substrate and having a first and second electrode, the first electrode being transparent and formed on the upper surface of the transparent substrate, a photoconductive film being formed such that it intervenes between the first and second electrodes, a light signal transmitted through the transparent substrate being transmitted through the first electrode to be incident on the photoconductive film, the second electrode being connected to the other end of the source-drain path of the MOS transistor;

a transparent insulating layer formed on the upper surface of the MOS transistor and capacitor;

a non-transparent conductive layer formed on the transparent insulating layer and connected to the other end of the source-drain path of the MOS transistor;

a display cell formed on the non-transparent conductive layer, the display cell including a display material layer formed on the non-transparent conductive layer and a transparent conductive layer formed on the display material layer, the light transmittance of the display material layer being variable according to a voltage applied between the non-transparent conductive layer and transparent conductive layer; and a window section for leading light incident on the display cell to the transparent substrate.

According to the invention, a desired display cell among solid-state cells can be driven by selecting corresponding address and data lines as noted above, whereby image display can be obtained as in an ordinary liquid crystal display device. Further, when an object is disposed under the substrate with the display material layer of the display cell in a transparent state and light is caused to be incident on the substrate from above through the window section, the photoconductive film can receive a light image reflected by the object. Imaging of the object thus can be obtained by detecting the resultant changes in potential across the capacitor. Further, by disposing a photosensitive sheet under the substrate while the display of image is in force with the driving of given display cells and uniformly illuminating the substrate with light from above, the photosensitive sheet can be illuminated by light which has been transmittance modulated by the display material layer of the display cells. Thus, a hard copy of the displayed image can be obtained.

As described above, it is possible to realize three different functions, i.e., displaying function, imaging function and printing function with a single device, which is very useful for reducing size, weight and cost of the device. Besides, the three functions noted above can be provided by a single solid-state cell, and the structure thereof can be made comparatively simple. The invention is thus very useful from the standpoint of the manufacturing techniques as well.

The solid-state cell according to the invention can provide not only the functions noted above but is also expected to provide various other functions.

BRIEF DESCRIPTION OF THE DRAWINGS

Other objects and advantages of the invention will be more apparent from the following description taken in conjunction with the accompanying drawings, in which:

FIGS. 6 and 7 are sectional views showing different embodiments of the solid-state optical device according to the invention;

DETAILED DESCRIPTION OF THE PREFERRED EMBODIMENTS

Figure 1:
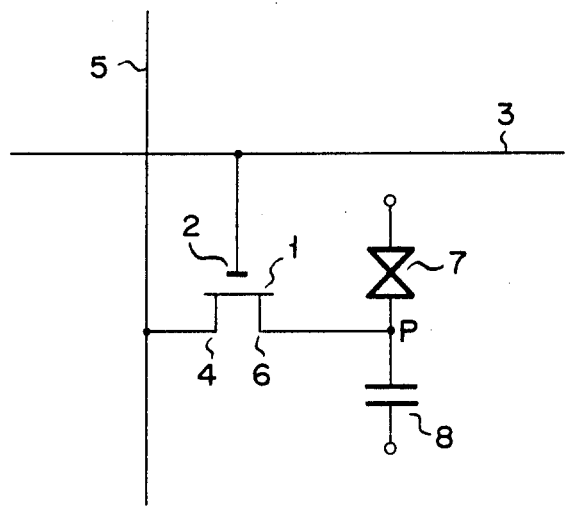
FIG. 1 is a circuit diagram showing an equivalent electric circuit of a solid-state cell according to the invention.
Figure 2:
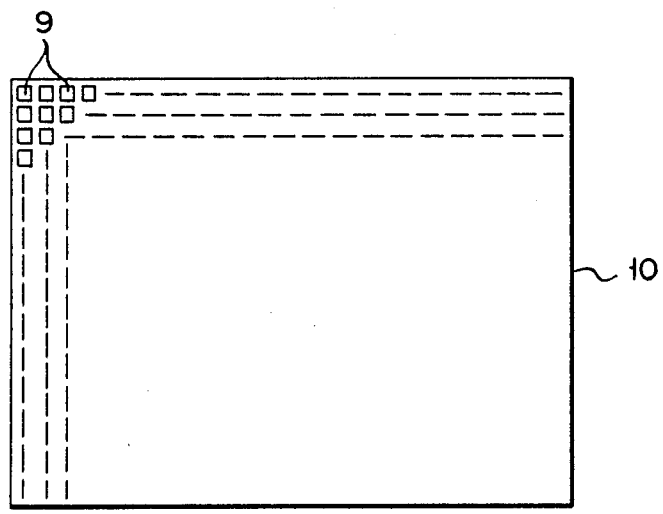
FIG. 2 is a plan view showing a plurality of solid-state cells arrayed as a matrix on a panel.

FIG. 1 shows an equivalent electric circuit of one picture element of a first embodiment of the solid-state optical device according to the invention. The element comprises a MOS transistor 1 with the gate 2 thereof connected to an address line 3. Its source 4 is connected to a data line 5, and its drain 6 is connected to a node P between a liquid crystal cell (display cell) 7 which consists of a liquid crystal material and a capacitor 8 into which signal charge on the data line 5 is injected. A plurality of picture elements as described above may be arrayed as a matrix as shown in FIG. 2.

The equivalent circuit of FIG. 1 is the same as of one picture element in a well-known switching matrix liquid crystal display device. The device of this embodiment is different from the switching matrix liquid crystal display device in the following points.

Firstly, there is a high resistivity photoconductive film between pair electrodes of the capacitor 8. Secondly, a window section is provided to permit illumination of the photoconductive film with light. Thirdly, light having been transmitted through the liquid crystal cell can be led to the outside.

In order to obtain image display with this structure, given liquid crystal cells 7 may be driven by selecting corresponding address and data lines 3 and 5 in such a state that no light will be incident on the photoconductive film of the capacitor 8. This operation is the same as the operation of the normal liquid crystal display device. Further, for imaging, a predetermined reset voltage is applied to the node P between the liquid crystal cell 7 and capacitor 8 through the data line 5. Subsequently, the node P is held in a floating state by turning off the MOS transistor 1 and holding it "off" for a given period. In this state, the light reflected from the object is led to be incident on the photoconductive film of the capacitor 8, whereby charge is injected from the photoconductive film into the terminal P in proportion to the amount of the illuminating light. The potential on the terminal P is varied according to the amount of the incident light. By detecting the potential changes the incident light signal can be detected so that the object can be imaged. For copying, the liquid crystal cells 7 is illuminated while the image is displayed on the liquid crystal cells. The image displayed on the liquid crystal cells thus can be transferred onto a photosensitive sheet to obtain a hard copy of the displayed image.

Figure 3A:
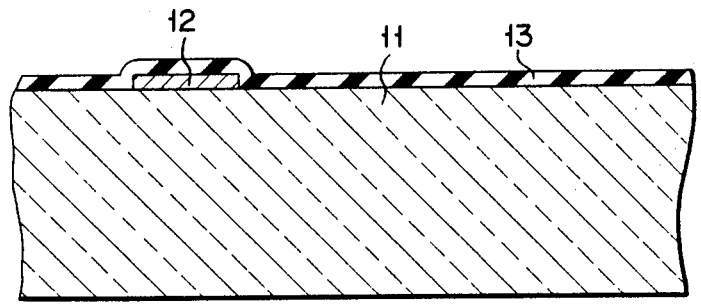
FIGS. 3A through 3F are sectional views showing a method of manufacturing a solid-state cell constituting a solid-state optical device according to the invention.
Figure 3B:
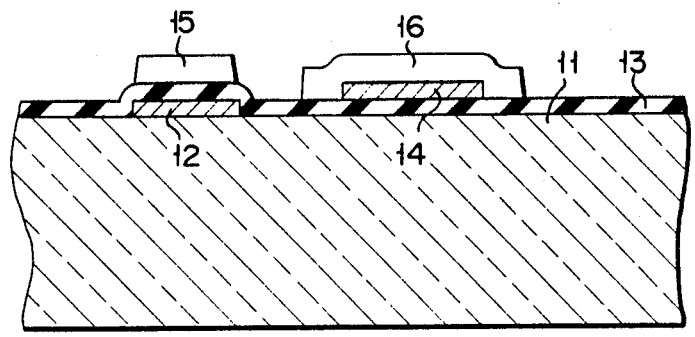

The method of manufacture and specific structure of the solid-state cell according to the invention will now be described with reference to FIGS. 3A through 3F. First, on a transparent glass substrate 11, as shown in FIG. 3A, is formed a first conductive film 12 of molybdenum or aluminum. Then a first insulating film 13 consisting of a CVD-SiO$_2$ film is formed to cover the entire surface. The first conductive film 12 will serve as the gate 2 of the MOS transistor 1 noted above, while the first insulating film 13 will serve as the gate oxide film of the MOS transistor 1. A transparent second conductive film 14 of In$_2$O$_3$, for instance, as shown in FIG. 3B, is subsequently selectively formed on the first insulating film 13. A high resistivity amorphous silicon film having photoconductivity is then formed over the entire surface and patterned to form a channel region 15 on the first insulating film 13 over the first conductive film 12 and a photoconductive film 16 of capacitor 8 on the second conductive film 14.

Figure 3C:
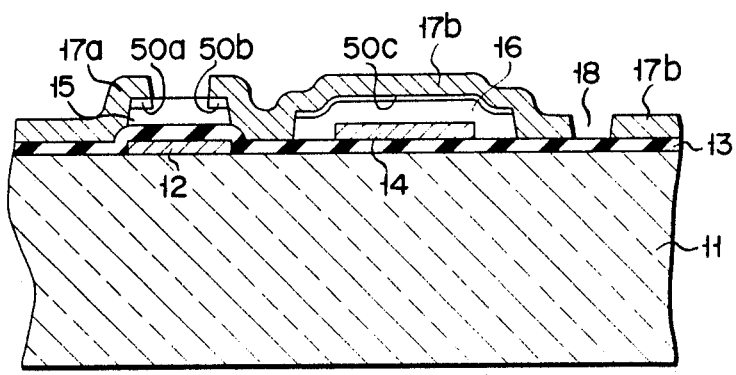

A conductive film is then formed over the entire surface of the wafer and patterned to form third conductive films 17a and 17b, as shown in FIG. 3C. The third conductive film 17b is formed with a first window or aperture 18 for light transmission therethrough. The third conductive film 17a is connected to the data line 5 noted above, and the first conductive film 12 constituting the gate 2 is connected to the address line 3. The third conductive film 17b constitutes the other electrode of the capacitor 8. The MOS transistor 1 consisting of the channel region 15, gate 12 and gate oxide film, is a commonly termed staggered type thin film transistor having a thin film structure. The third conductive film 17a serves as the source electrode of the MOS transistor 1, while the third conductive film 17b serves as the drain electrode of the MOS transistor 1. Reference numerals 50a, 50b and 50c in FIG. 3C designate respective ohmic layers provided for reducing the resistance of the contact between the conductive film and amorphous silicon film.

Figure 3D:
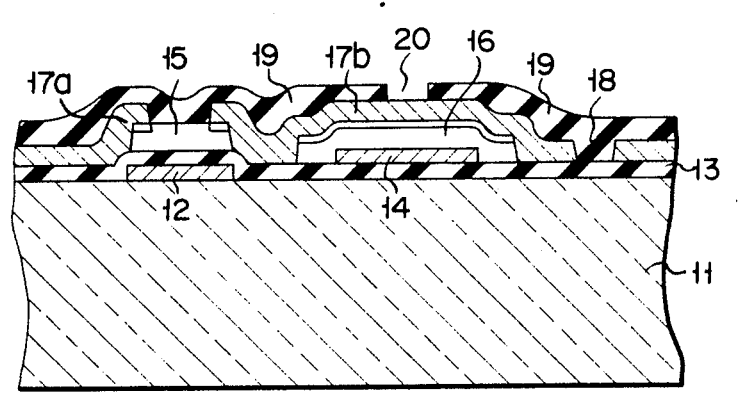
Figure 3E:
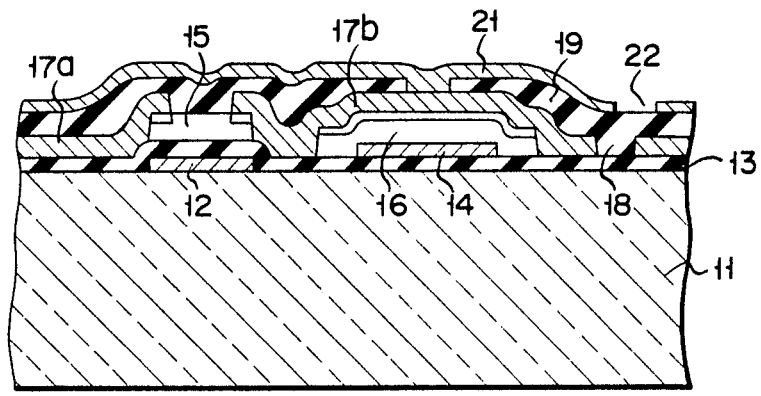

A second insulating film 19 of a transparent material, e.g., a CVD-SiO$_2$ film, is subsequently formed over the entire surface as shown in FIG. 3D. It is then formed with a contact hole 20 over the third electrode 17b. A transparent fourth conductive film 21, as shown in FIG. 3E, is then formed over the entire surface. It is then formed with a second window or aperture 22 for light signal transmission. The conductive film 21 serves as one electrode of the liquid crystal cell 7 noted above.

Figure 3F:
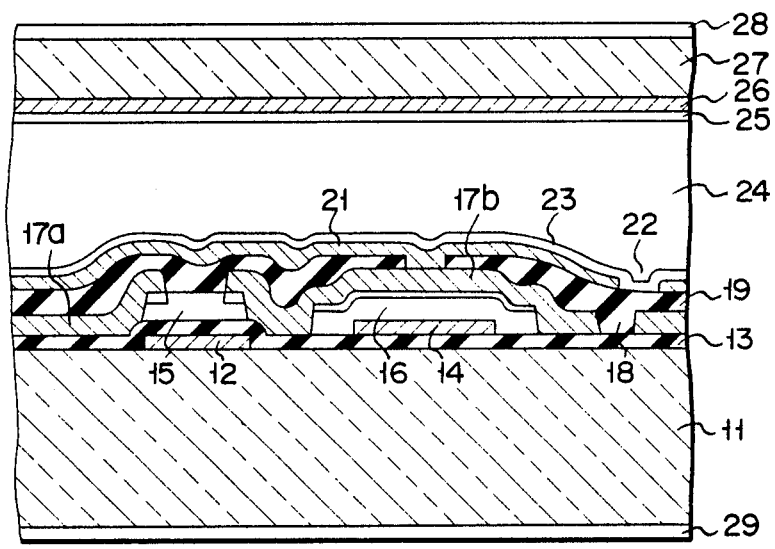

Afterwards, the liquid crystal display device is completed by the ordinary process of fabrication. More specifically, as shown in FIG. 3F, a first orientation layer 23, a liquid crystal layer 24 as display material layer, a second orientation layer 25, a transparent fifth conductive layer 26, a glass plate 27 and a polarizing layer 28 are laminatedly formed in the mentioned order. An anti-reflection film 29 is further formed on the underside of the substrate 11. The solid-state cell that is obtained in the manner as described corresponds to one picture element 9 shown in FIG. 2. A plurality of these solid-state cells are formed, in a matrix array for instance, on the substrate 11.

Figure 4:
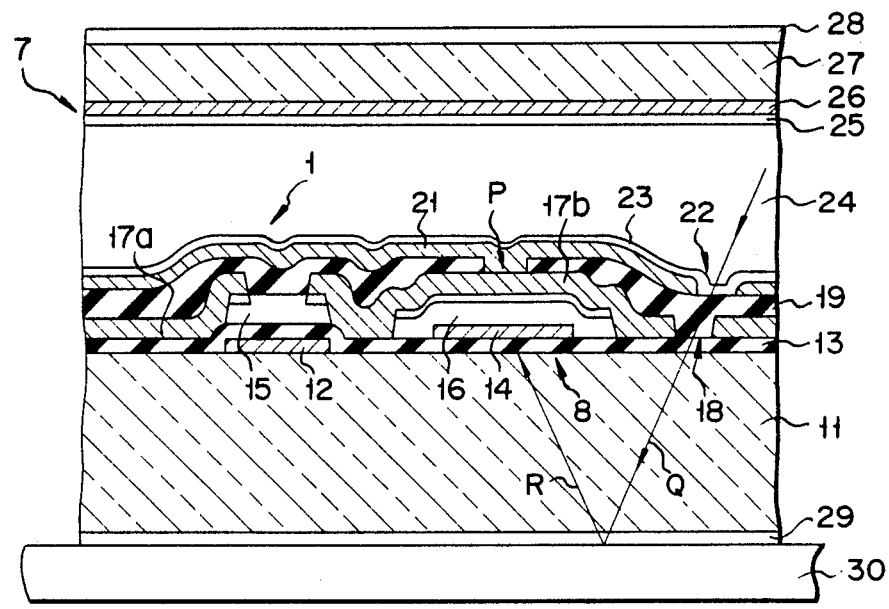
FIGS. 4 and 5 are sectional views showing examples of use of the solid-state cell according to the invention.

The operation of the solid-state device with a matrix array of solid-state cells having the above structure will now be described. For imaging, an object 30 as shown in FIG. 4, e.g., a paper sheet bearing letters and numeral figures written thereon, is disposed in close contact with the underside of the glass substrate 11. The MOS transistor 1 is preliminarily turned on. If the liquid crystal layer 24 is of the guest/host (GH) type, it is rendered transparent by applying a voltage of the order of 6 V to the third conductive film 17b constituting the floating terminal P. Then the MOS transistor 1 is turned off, and the potential on the first conductive film 14 is set to be in the neighborhood of 0 V. When the system is illuminated from above, the illuminating light is led through the windows 18 and 22 to be incident on the substrate 11. Incident light Q is reflected by the object 30 in close contact with the underside of the substrate 11, and reflected light R therefrom is transmitted through the transparent first insulating film 13 and transparent second conductive film 14 to be incident on the photoconductive film 16 of amorphous silicon constituting the capacitor 8. Electron-hole pairs are thus produced in the photoconductive film 16 in correspondence to the amount of reflected light. Electrons are injected as signal charge into the third conductive film 17b and stored therein. Holes are led away through the second conductive film 17b. The potential on the third conductive film 17b is reduced according to the amount of injected charge.

The amount of signal charge injected into the third conductive film 17b depends on the amount of light reflected from the object 30 during the signal charge storage period. The amount of light reflected from the object 30 in turn depends on image data such as letters and numeral figures written on the object 30. The amount of signal charge injected into the third conductive film thus corresponds to the image data of the object 30. The decrease of the potential on the conductive film 17b also corresponds to the image data. After the signal charge storage period is over, the transistor 1 is turned on, and a new preset voltage is applied to the third conductive film 17b. Charging current flowing through the data line 5 at this time is detected, whereby image data can be electrically detected, that is, the object 30 can be imaged.

Figure 5:
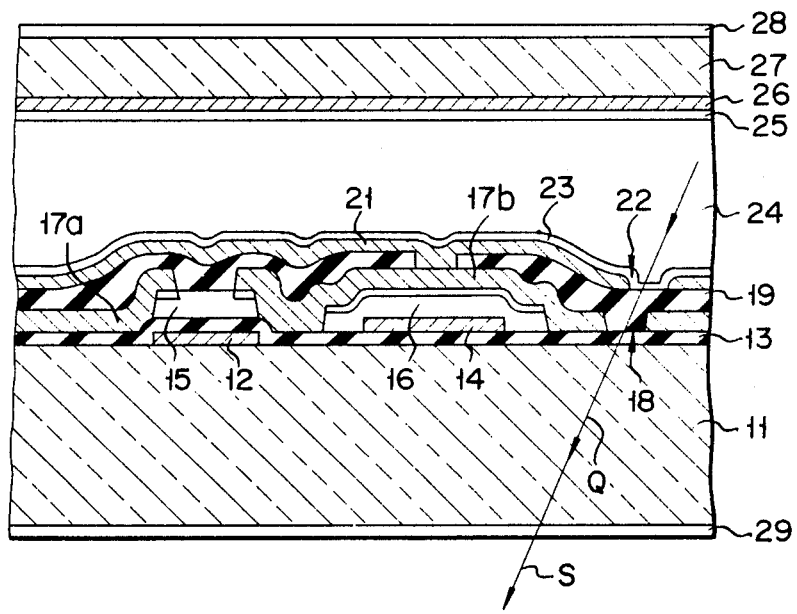

For the display of image, the object 30 is removed from the underside of the glass substrate 11. In this state, the incident light Q is not reflected at the underside of the substrate 11 but is transmitted through the substrate because of the presence of the anti-reflection film 29 on the underside of the substrate 11. The transmitted light is shown as line S in FIG. 5. In this case, there is no possibility for any reflected light R to be incident on the photoconductive film 16 of the capacitor 8. Further, the possibility of reincidence of transmitted light S on the substrate 11 can be eliminated, for instance, by disposing a high light absorbance member under the glass substrate 11. Image display can be obtained in this state by applying display signal voltage to the liquid crystal cells 7 of given solid-state cells by selecting corresponding address and data lines 3 and 5.

For printing, a photosensitive sheet, for instance, a dry silver photosensitive sheet, is disposed in close contact with the underside of the glass substrate 11 in place of the object 30 in the image display mode, i.e., with a given image displayed on the liquid crystal cells 7. When the device in this state is uniformly illuminated from above, the illuminating light is transmitted through the liquid crystal cell 7 and windows 22 and 18 to be incident on the substrate 11. The photosensitive sheet is illuminated by the incident light Q. The intensity of light transmitted through the liquid crystal layer 24 is varied according to the display mode of the liquid crystal cell 7. In other words, the transmittance of the incidence light Q is modulated according to the display mode of the liquid crystal cell 7, and the photosensitive sheet is illuminated by the modulated incident light Q. By subsequently developing the photosensitive sheet and heating it at 150° C. for fixing, a hard copy of the pattern displayed on the liquid crystal cells 7 can be obtained, that is, printing can be obtained.

As has been shown, the device according to the invention permits imaging and printing as well as display while its picture element has the same equivalent electric circuit as that in a prior art liquid crystal display device. In other words, the device according to the invention is not a mere display panel but a DIP (displaying, imaging and printing) panel with the displaying, imaging and printing functions. These functions may be used independently. Also, two functions, e.g., displaying and imaging, may be employed in combination. Further, the integration density for one cell may be substantially the same as for one picture element in the prior art liquid crystal display device, and the cell can be readily fabricated using the present semiconductor manufacturing techniques. The device according to the invention thus has very high practical utility.

FIG. 6 is a schematic sectional view showing a second embodiment of the invention. The same parts as those in FIG. 3F are designated by like reference numerals. This embodiment is different from the preceding first embodiment in that two-dimensional lenticule lenses are provided. More specifically, a two-dimensional lenticule lens 41 is provided under glass substrate 11 such that they correspond to respective picture elements $40_l$ to $40_n$. Anti-reflection film 29 is provided under the lenses 41. Light reflected from object 30 is focused by individual lens elements $41_l$ to $41_n$ to be incident on the respectively associated picture elements $40_l$ to $40_n$. Each of the picture elements $40_l$ to $40_n$ corresponds to a solid-state cell and consists of photoconductive films 12 and 14, conductive films 17a and 17b, insulating films 13 and 19, channel 15 and photoconductive film 16 as noted before. Actually, conductive films 22 and 26 and orientation layers 23, 25 and 28 are also the essential components of the cell, but they are not shown in FIG. 5.

With the structure as described, it is possible to eliminate diffusion of light reflected from the object 30, and hence deterioration of resolution due to diffusion of reflected light. Further, since the two-dimensional lenticule lens 41 is used, the object 30 may be disposed in use not in close contact with the underside of the glass substrate 11 without possibility of deteriorating the resolution. This is effective for preventing the generation of obscurity due to wrinkles or bending of paper constituting the object 30. Usually, sufficient resolution of imaging can be obtained by setting the distance between the object 30 and glass substrate 11 to be within the focal depth of the two-dimensional lenticule lens 41. The radius of curvature of the lens elements $41_l$ to $41_n$ may be suitably determined by taking the thickness of the glass substrate 11, pitch of picture elements, etc. into considerations.

FIG. 7 is a schematic sectional view showing a third embodiment of the invention. The same parts as those in FIGS. 3F and 6 are designated by like reference numerals. This embodiment is different from the previous first embodiment in that an optical fiber plate 42 is used in lieu of glass substrate 11. The optical fiber plate 42 is formed by binding optical fiber elements $42_l$ to $42_n$ of the same diameter as the pitch of picture elements into the form of a plate, the individual optical fiber elements $42_l$ to $42_n$ corresponding to the respective picture elements $40_l$ to $40_n$ in a ratio of 1:1.

With this structure, light reflected from the object 30 can be led by each optical fiber element only to the associated picture element and will not be diffused to neighboring picture elements. It is thus possible to obtain the same effects as with the preceding second embodiment. Further, it has been proved that setting the distance between the optical fiber plate 42 and object 30 to be approximately one half the diameter of the optical fiber elements $42_l$ to $42_n$ does not substantially deteriorate the resolution.

Figure 8:
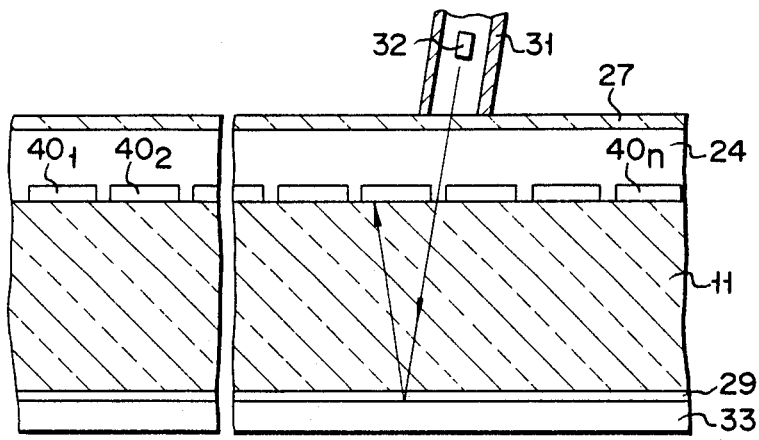
FIG. 8 is a sectional view showing a further example of use of the solid-state optical device according to the invention.

A further use of the solid-state optical device according to the invention will be described with reference to FIG. 8. This example concerns image input by a light pen. It has the same DIP panel structure as those in FIGS. 3 and 6, and the same parts are designated by like reference numerals. An ordinary light pen has built-in light-receiving elements. It receives light signal radiated from the display material and detects addresses from the instants of reception of light. Where such a light pen is used to write letters and the like on the display screen, problems arise if the frame display cycle period or the period of light emission for one picture element is increased. More specifically, in such a case as when the pen must be moved somewhat slowly, which is very inconvenient. Further, the use of the light pen as described is impossible where the display material itself has a memory function.

In the instant example according to the invention, light pen 31 has a light source 32. The light source 32 preferably has directivity and consists of, for instance, a semiconductor laser element. A reflector 33 consisting of white paper or the like is disposed in close contact with glass substrate 11 in lieu of object 30 noted above.

When the light pen 31 is moved in this state, light projected therefrom and incident on the glass substrate 11 is reflected by the reflector 33 under the substrate 11, and given picture elements are illuminated by the reflected light. Since the light-receiving section of each of the picture elements $40_l$ to $40_n$ constituting a solid-state cell is of a storage type, that is, it stores signal charge until the instant of the next readout, the integral signal stored during one frame in each picture element depends on the amount of incident light. Thus, if the intensity of light of the light source 32 of the light pen 31 is properly controlled, the trace of movement of the light pen 31, i.e., image data, can be detected even if the light pen 31 is quickly moved. The reflector 33 preferably more strongly reflects light only in the wavelength range of the light source 32 of the light pen 31. In this case, the influecne of external leaking light can be alleviated.

The embodiments described above are by no means limitative. For instance, the MOS transistor 1 in FIG. 4 need not be of a thin film transistor of staggered type but it may be of the ordinary coplaner type as well. This is so because the MOS transistor in the embodiment of FIG. 4 only has a switching function, and no light signal is incident on it.

Further, if the first conductive film 12 in the case of FIG. 4 is made of a transparent conductor, e.g., $In_2O_3$, it is possible to let a light signal be incident on both the channel region 15 of the MOS transistor 1 and the photoconductive film 16 of the capacitor 8. In this case, carriers produced in the channel region 15 of the MOS transistor 1 can be supplied to the node P through the drain. With this arrangement the imaging sensitivity of the solid-state cell can be further improved.

Figure 9:
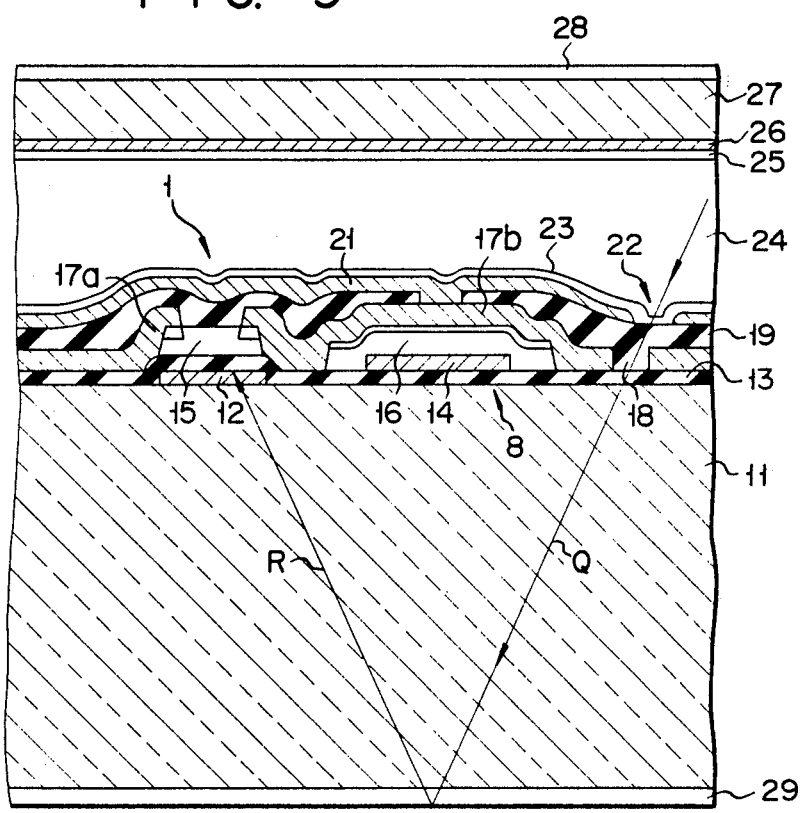
FIG. 9 is a sectional view showing a further embodiment of the solid-state optical device according to the invention.

It is further possible to form first conductive film 12 of a transparent conductor, e.g., $In_2O_3$ and form second conductive film 14 of a non-transparent conductor, e.g., aluminum, as shown in FIG. 9. With this arrangement a light signal can be led through the first conductive film 12 and transparent gate insulating film to the channel region 15 of the MOS transistor 1 to cause generation of electron-hole pairs there. Electrons thus produced are led through the drain of the MOS transistor 1 to the third conductive film 17b to reduce the potential on the node P shown in FIG. 1. In this case, the same effects as with the embodiment of FIG. 4 can be obtained. In this instance, there is no need of causing incidence of any light signal on the dielectric layer of the capacitor 8. The capacitor 8 need not be of photoconductive film of amorphous silicon, for instance.

The material of the channel region 15 of the MOS transistor 1 and the photoconductive film constituting the capacitor 8 is not limited to amorphous silicon, but any other photoconductive film having photoconductivity may be used as well. Further, in order to obtain high resistivity, the amorphous silicon film may be formed to have a p-i structure by doping in intrinsic amorphous silicon film with a p-type impurity.

Furthermore, the structures of the MOS transistor and capacitor in the above embodiments are by no means limitative and can be variously modified to meet given specifications.

Moreover, the material of the display material layer of the display cell is not limited to liquid crystal, but it is possible to use any other material as well, e.g., material for an electrochromic display, so long as the light transmittance of the material is variable according to the applied voltage. Further, the structure and material of the orientation layers, polarizing layer, glass substrate and conductive layer for display cell are not limited to those in the above embodiments but can be suitably modified according to given specifications. Various further changes and modifications are possible without departing from the scope of the invention.

What is claimed is:

1. A solid-state optical device with a plurality of cells having a plurality of optical functions, each of said cells comprising:

a transparent substrate;

an anti-reflection film formed on the lower surface of said transparent substrate;

a MOS transistor formed on the upper surface of said transparent substrate and including a source-drain path having one end connected to a data line, a channel region, a gate insulating film and a gate electrode connected to an address line;

a capacitor formed on the upper surface of said transparent substrate and having a first and second electrode, said first electrode being transparent and formed on the upper surface of said transparent substrate, a photoconductive film being formed such that it intervenes between said first and second electrodes, a light signal transmitted through said transparent substrate being transmitted through said first electrode to be incident on said photoconductive film, said second electrode being connected to the other end of the source-drain path of said MOS transistor;

a transparent insulating layer formed on the upper surface of said MOS transistor and capacitor;

a non-transparent conductive layer formed on said transparent insulating layer and connected to the other end of the source-drain path of said MOS transistor;

a display cell formed on said non-transparent conductive layer, said display cell including a display material layer formed on said non-transparent conductive layer and a transparent conductive layer formed on said display material layer, the light transmittance of said display material layer being variable according to a voltage applied between said non-transparent conductive layer and transparent conductive layer; and light transmitting means for leading light incident on said display cell to said transparent substrate.

2. The solid-state optical device according to claim 1, wherein:
said photoconductive film is formed of amorphous silicon.

3. The solid-state optical device according to claim 2, wherein:
said photoconductive film is formed of an intrinsic amorphous silicon layer contiguous to said first electrode and a p-type amorphous silicon layer intervening between said intrinsic amorphous layer and second electrode.

4. The solid-state optical device according to claim 1, wherein:
said display cell is a liquid crystal cell.

5. The solid-state optical device according to claim 1, wherein:
two-dimensional lenticule lenses are formed under said transparent substrate to focus light reflected from an object disposed underneath said anti-reflection film on said respective cells, said two-dimensional lenticule lenses corresponding in number to the number of said cells, said anti-reflection film being formed on the surface of said two-dimensional lenticule lenses.

6. The solid-state optical device according to claim 1, wherein:
said transparent substrate is formed optical fiber plates corresponding in number to the number of said cells, each said optical fiber plate corresponding to an associated one of said cells and being capable of leading said light signal to said associated cell.

7. The solid-state optical device accoding to claim 1, wherein:
said light transmitting means has a window formed in said non-transparent conductive layer, said light signal being led through said window to said transparent substrate.

8. The solid-state optical device according to claim 1, wherein:
said gate electrode and gate insulating film of said MOS transistor are transparent, said gate electrode being formed on the upper surface of said transparent substrate, said gate insulating film being formed on said electrode; and
said channel region of said MOS transistor is made of a photo-conductive film, said light signal transmitted through said transparent substrate being transmitted through said gate electrode and gate insulating film to be incident on said channel region.

9. A solid-state optical device having a plurality of cells having a plurality of optical functions, each of said cells comprising:
a transparent substrate;
an anti-reflection film formed on the lower surface of said transparent substrate;
a MOS transistor formed on the upper surface of said transparent substrate and including a source-drain path having one end connected to a data line, a channel region, a gate insulating film and a gate electrode connected to an address line, said gate electrode being transparent and formed on the upper surface of said transparent substrate, said gate insulating film being transparent and formed on said gate electrode, said channel region being constituted by a photoconductive film, a light signal transmitted through said transparent substrate being transmitted through said gate electrode and gate insulating film to be incident on said photoconductive film;
a capacitor formed on the upper surface of said transparent substrate and having a first and second electrode, said first electrode being connected to the other end of said source-drain path of said MOS transistor;
a transparent insulating layer formed on the upper surface of said MOS transistor and capacitor;
a non-transparent conductive layer formed on said transparent insulating layer and connected to the other end of said source-drain path of said MOS transistor;
a display cell formed on said non-transparent conductive layer, said display cell including a display material layer formed on said non-transparent conductive layer and a transparent conductive layer formed on said display material layer, the light transmittance of said display material layer being variable according to a voltage applied between said non-transparent conductive layer and transparent conductive layer; and
light transmitting means for leading light incident on said display cell to said transparent substrate.

10. The solid-state optical device according to claim 9, wherein:
said MOS transistor is a thin film transistor of staggered type.

* * * * *